United States Patent [19]
Kuwabara

[11] 3,730,638
[45] May 1, 1973

[54] SPEED GOVERNOR

[75] Inventor: Takao Kuwabara, Hitachi, Japan

[73] Assignee: Hitachi, Ltd., Tokyo, Japan

[22] Filed: Dec. 16, 1971

[21] Appl. No.: 208,795

[30] Foreign Application Priority Data

Dec. 16, 1970   Japan.................................45/111751

[52] U.S. Cl.........................................415/24, 415/1
[51] Int. Cl................................................F03b 3/06
[58] Field of Search .......................415/1, 24; 137/12

[56] References Cited

UNITED STATES PATENTS 3,275,293   9/1966   Hosogai et al............................415/1
3,339,567   9/1967   Fukasu et al............................415/24

OTHER PUBLICATIONS

Japanese Pub. No. 22961/69, Jan. 29, 1966– Toshiba KK

Primary Examiner—C. J. Husar
Attorney—Craig, Antonelli and Hill

[57] ABSTRACT

A speed governor system for a hydraulic or pumper turbine being fed water from a penstock for controlling the output of the turbine under varying load conditions. When the load of a generator coupled to the turbine is abruptly cut off, the governor system closes the guide vane assembly to limit the flow of water to the turbine at a speed in accordance with an estimated water pressure rise in the penstock. The water pressure rise is estimated from the operational turbine factors including rotational frequency of the turbine runner, the acceleration thereof, the water head and the position of the guide vane assembly. The governor system acts to prevent a dangerous level of water pressure rise.

11 Claims, 8 Drawing Figures

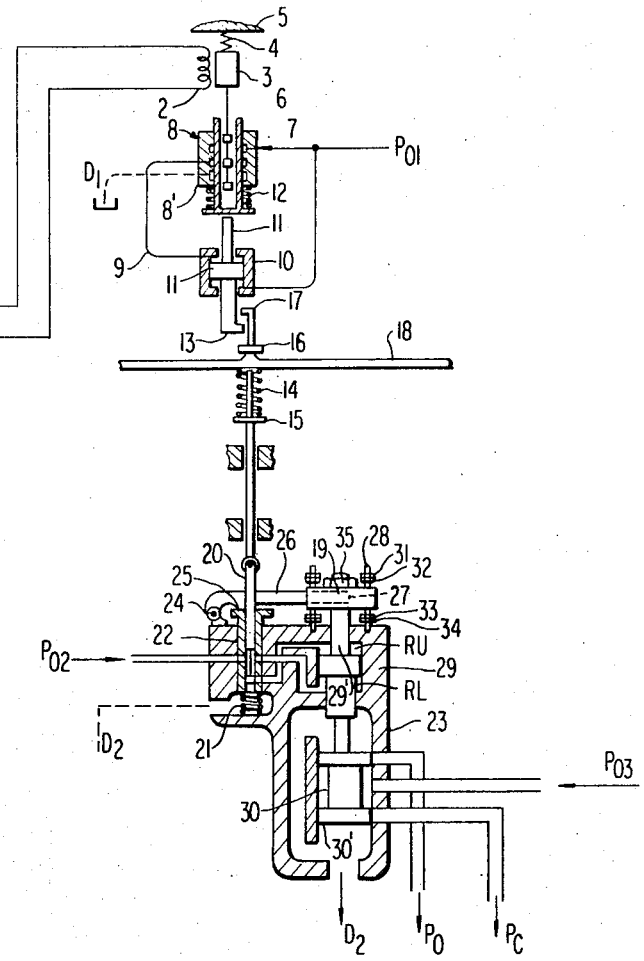
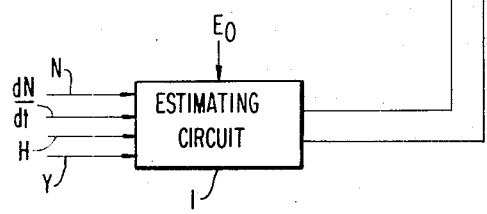
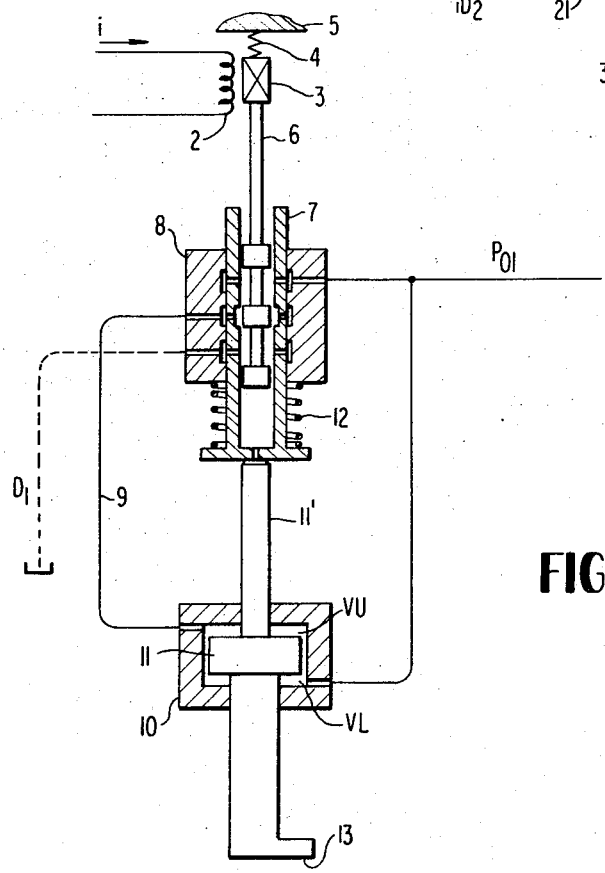
FIG.4
FIG.5

SPEED GOVERNOR

The present invention relates to a governor system for use in a hydraulic or pumper turbine.

Hydraulic or pumper turbines are generally provided with a speed governor which becomes operational in accordance with the loading conditions. Thus, when the load of the generator coupled to the turbine is abruptly cut off due to, for example, some problem with or burning out of the electrical transformer, or when the load is completely removed or excessively reduced such as during the switching operation of a pump turbine from turbine operation to pump operation, the rotational frequency of the turbine runner is sharply increased as the resistance to rotation of the runner is lowered. When the rotational frequency of the runner is sharply increased, the speed governor operates to move the guide vanes in the closing direction so as to check the rise in rotational frequency to stop the turbine or to control and stabilize the flow rate of water conforming to the decreased load. On the other hand, in a low-speed turbine there is a tendency to excessively reduce the water flow rate with a rise in rotational frequency, this tendency being termed the "self-controlling characteristic of the turbine." In the event of a reduction of the load, the self-controlling characteristic is coupled with the water flow reducing action of the governor causing an abnormal rise of pressure in the penstock feeding the turbine. In a long penstock such as used in a power plant, a great amount of water passes therethrough having an extremely high energy level. Accordingly, a water flow reduction causes the water pressure in such penstock to rise to a dangerous level, such that an extremely stout and strong penstock is required to contain the water. Such a penstock of course requires additional cost for manufacture and is therefore economically disadvantageous. It can thus be seen that when the load is cut off, there arises the requirement for controlling both the rise of rotational frequency of the runner and the rise of pressure in the penstock, but these two requirements are mutually contradictory and it is impossible to satisfy both requirements at the same time. Therefore, the intrinsic governing performance of the governor must be temporarily restrained, while giving priority to control of the pressure rise which involves a higher degree of danger.

Conventionally, in order to meet such requirements, there has been employed a method in which, upon the occurrence of a load break in a hydraulic turbine, a timer is operated to retain or lock the opening of the guide vanes in the present position for a certain period of time so as to check the rise of water pressure caused by closure of the guide vanes and only permitting a pressure rise by increase of the rotational frequency of the runner. When the rise in the water pressure finally begins to fall, the guide vanes are moved in the closing direction. In another known method, the guide vanes are widely opened once at the moment of load break so as to increase the flow rate to thereby check rise of water pressure. However, according to such known methods, the degree of rise of water pressure by a load break is greatly affected by such factors as the rise of rotational frequency of the runner, the opening of the guide vanes, the head of the fluid and the amount of the load fluctuation, and hence, the checked amount of pressure rise in the penstock is varied according to the individual case.

As will be apparent from the graph of FIG. 1, when the opening Y of the guide vanes at the time of a load break is $Y_1 < Y_2$ and the head H is $H_1 < H_2$, the water pressure rise $\Delta P$ resulting from the increase of rotational frequency N varies widely according to the individual case. The relationship between the opening and closing speed of the guide vanes and variation of water pressure is shown in FIG. 2, from which it is noted that water pressure rise is gradually accelerated as the guide vanes move in the closing direction. Therefore, the time duration in which the guide vanes are retained at a fixed opening by a timer must be set in accordance with the condition where the above-noted factors will give maximum water pressure rise. In other words, in the example of FIG. 1, the guide vane retention time must be set by calculating the possible rise of water pressure when the guide vane opening is $Y_2$ and the head is $H_2$.

According to conventional systems wherein the guide vanes are held or locked at a fixed opening for a certain prescribed period by a timer, when the load is cut off, for example, at the guide vane opening of $Y_1$ and head of $H_1$ as shown in FIG. 1, the timer will be set for a time longer than actually required, thereby maintaining the guide vanes locked at a fixed opening even after the water pressure rise has passed its peak. This causes not only a loss of effective water, but also a loss of time since the time required for stopping the turbine is always fixed and the time at which the closing operation of the guide vanes starts could actually begin sooner in some cases. Also, as long as the timer is set, the guide vanes are kept trammelled irrespective of the actual situation of the turbine, so that even if the load break is eliminated immediately and any danger of a water pressure rise is removed, the speed governor cannot resume its normal action, but rather is forced to operate at an extremely reduced efficiency. Furthermore, since there is no control of the rotational frequency of the runner in these arrangements, it is desirable to quickly restore the normal governing function of the speed governor when the water pressure rise has passed its peak point.

The problems and disadvantages of the prior art are solved in accordance with the speed governor system of the present invention which, as shown in FIG. 3, comprises a rotational frequency (N) detecting section, a pressure-distributing valve operable in response to the output of said detecting section, a servo motor actuated in response to the pressure-distributing valve to operate the guide vanes (not shown), and a restoration circuit for feeding back the amount of movement of the servo motor to the pressure-distributing valve. The speed governing system also includes a circuit for estimating the possible water pressure rise $\Delta P$ by detecting the various factors causing such pressure rise $\Delta P$, such as rotational frequency N of the runner (not shown), acceleration $dN/dt$, the head H and the guide vane opening Y with a limiter $\epsilon$ having a limiter operating section C being actuated in response to the output of the estimation circuit to regulate the amount of movement of the pressure-distributing valve in the guide vane closing direction.

It is therefore an object of the present invention to provide a speed governor system for a turbine which overcomes the problems and disadvantages of prior art arrangements.

It is another object of the present invention to provide a speed governor system which permits quick restoration of normal operating conditions after a turbine load problem has been corrected.

It is another object of the present invention to provide a speed governor system which provides for optimum control of the rise of water pressure and the rise of the rotational frequency of the turbine.

It is a further object of the present invention to provide a speed governor system which optimally utilizes the self-controlling characteristic of the hydraulic turbine, that is, the characteristic which causes decrease of the water flow rate with rise of rotational frequency of the turbine, and in which the governing action is temporarily checked in the event of load break so as to control the rate of decrease of water quantity to minimize the rise of water pressure in the penstock and wherein the normal governing action of the turbine can be quickly restored as soon as the trouble is removed thus permitting maximum speed governing performance of the turbine at all times.

These and further objects, features and advantages of the present invention will become more apparent from the following description when taken in conjunction with the accompanying drawings which show, for purposes of illustration only, several embodiments in accordance with the present invention and wherein FIG. 1 is a graph showing the rise of pressure in a penstock and the influences of various factors on the pressure rise at the time of a sharp decline of hydraulic turbine load;

FIG. 4 is a somewhat schematic view of a speed governor system according to the present invention;

FIG. 5 is a detailed view of a portion of the speed governor system of FIG. 4;

Figure 1:
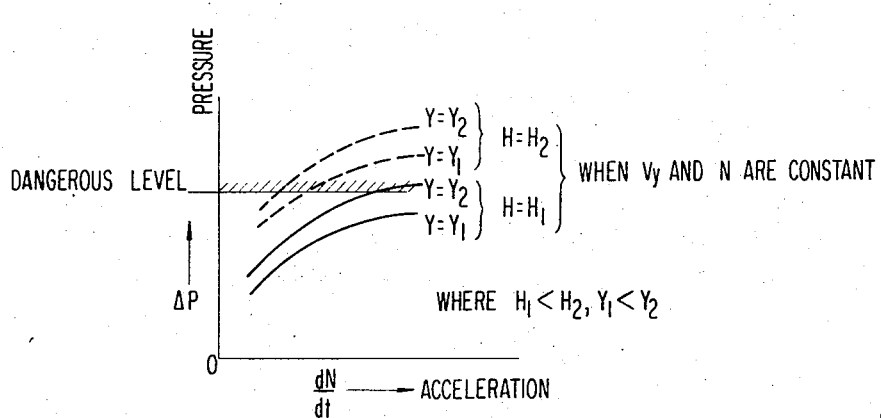
Figure 2:
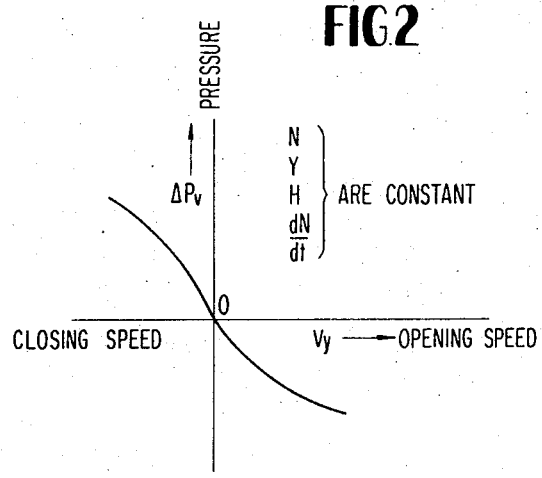
FIG. 2 is a graph showing the rate of rise or fall of water pressure relative to the opening and closing speed of guide vanes at the time of sharp load decline.

Referring now to FIG. 4 of the drawing which discloses an embodiment of the present invention and wherein like parts of the several embodiments are designated by like reference numerals, reference numeral 1 designates an estimation circuit which detects the values as well as the amounts of variation of the factors causing water pressure rise $\Delta P$, such as rotational frequency $N$, acceleration $dN/dt$, the head $H$ and the guide vane opening $Y$, and estimates $\Delta P$ at the time of load break by synthesizing the values detected. It is possible to approximately calculate the estimated value $\Delta P_E$ by using an approximation formula such as $f(N \cdot dN/dt \cdot H \cdot Y)$. The $\Delta P_E$ setting provides the maximum value of water pressure acting at the respective parts of the turbine, such as the penstock or casing. The output of estimating circuit is fed to a transducer coil 2 which receives an electric current corresponding to the value of $\Delta P_E - Eo$ where $\Delta P_E$ is the estimated value of $\Delta P$ obtained in the $\Delta P$ estimating circuit and $Eo$ is a bias adjusting signal.

A movable coil 3 is disposed in opposition to the coil 2 and connected to an end of a spring 4 which has its other end connected to a fixture 5. A pilot valve 6 which is part of an operative valve 8 has its top end connected to the movable coil 3 and is slideably disposed in a sleeve 7 of the valve 8. As will be understood, the operating valve 8 includes a body portion 8', the sleeve 7 slideably movable therein which is constantly biased downwardly by a spring 12, and the pilot valve 6 which slides in the sleeve 7.

Figure 3:
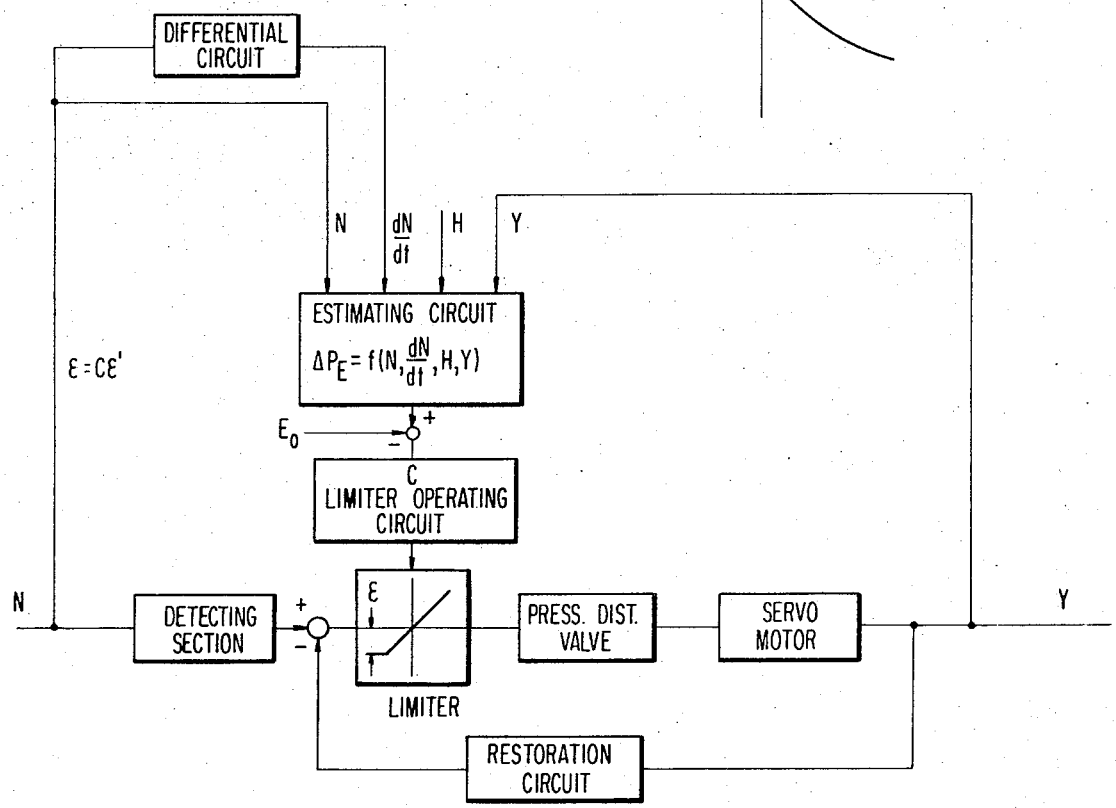
FIG. 3 is a block diagram showing the control circuit of the speed governor according to the present invention.

A pipe line 9 carrying oil under pressure, hereinafter referred to as pressure oil, communicates with the operating valve 8 and an adjuster means 10 having a differential piston 11. The piston 11 has a piston rod 11' which is in contact with the underside of the sleeve 7 and has at its other side an L-shaped stop arm 13. As shown in FIG. 5, the arm 13 has a larger cross-sectional area than the rod 11' so that the pressure-receiving area is larger in the chamber $Vu$ on the piston rod side and smaller in the chamber $V_L$ on the opposite side. The pipe line 9 opens into the chamber $Vu$, and pressure oil $Po_1$ is constantly introduced into the chamber $V_L$. The above-described series of cooperating members correspond to the limiter operating section C of FIG. 3.

As further shown in FIG. 4, there is provided a spring 14 having one end fastened to a spring seat 15 affixed to a pilot valve 20 and the other end connected to a lever 18 adapted to transmit instructions from a speed governor (not shown) to a pressure-distributing valve 23.

A stop member 16 is disposed at the middle of the pilot valve and the lever 18 is pressed against the member 16 by spring 14. An inverted L-shaped limiter arm 17 is provided at the top end of the pilot valve 20 for engagement with the L-shaped stop arm 13 so as to limit the downward movement of the pilot valve 20. These cooperating members including the spring 14 and the limiter arm 17 correspond to the limiter $\epsilon$ of FIG. 3.

The arrangement in FIG. 4 also includes a spring 21 for upwardly biasing a sleeve 22 which slides within the pressure-distributing valve 23. The sleeve 22 contacts at its top end a lever 26 such that the sleeve moves in accordance with movement of the lever 26. As shown, the sleeve is arranged to slideably receive the pilot valve 20. The lever 26 is provided with a fulcrum 24 about which the lever pivots and a projection 25 for contacting the top end of the sleeve 22. A pin 27 rotatably joins the lever 26 to a rod 29' of a differential piston 29 fitted in the pressure-distributing valve 23. Stud bolts 28 are arranged at the top end of the pressure-distributing valve 23 with the top and bottom ends of the stud bolts having nuts 31, 34 and lock nuts 32, 33, threadedly secured thereon such that the vertical stroke of a piece 19 secured to the top of said rod 29' by the nut 35, and hence vertical displacement of the differential piston 29, is regulated. The amount of such regulation on vertical displacement of the piston 29 is within the range in which a plunger 30 directly connected to the piston 29 can completely open the inlet and outlet for the oil under pressure.

Referring to FIG. 6, there is shown another embodiment according to the present invention in which reference numerals 40 and 42 denote solenoids. Reference numerals 41 and 43 designate contacts which are closed when the value of $dN/dt$ exceeds a certain predetermined value $\alpha1$, $\alpha2$, respectively. A contact 44 is closed when the head H exceeds a certain predetermined value H$o$, and a contact 45 is closed when the guide vane opening Y exceeds a certain predetermined value Y$o$. Movable coils 50 and 52 are arranged opposite the solenoids 40 and 42, respectively and are provided with stop arms 51 and 53, respectively. Adjusting bolts 54 and 56 are arranged in opposition to the movable coils 50 and 52, respectively, in a manner such that their projected lengths are adjusted by the respective adjusting nuts 55 and 56 to define the upper limit of movement of the movabe coils.

In the embodiment of FIGS. 4 and 5, when the load is abruptly reduced during an on-load operation, the rotational frequency N increases and the acceleration $dN/dt$ is also sharply increased so that the $\Delta$ P estimating circuit 1 is actuated to provide an electric current $i$ corresponding to the amount of change in the load to the transducer 2, causing the movable coil 3 to move upwardly to a position where the upward force produced by the coil 2 is balanced with the downward force of the spring 4. The upward movement of the movable coil 3 is accompanied by a simultaneous upward movement of the pilot valve 6, causing the pipe line 9 to communicate with discharge oil $D_1$, while the differential piston 11 is urged upwardly by the constant pressure oil $Po_1$ and pushes the sleeve 7 upwardly. Upward movement of the sleeve 7 is continued until its communication with the pipe line 9 is cut off, that is until the outward flow of oil in the chamber Vu of the adjusting means 10 to discharge oil $D_1$ is intercepted. Upward movement of the differential piston 11 also causes simultaneous upward movement of the stop arm 13, thus diminishing the space between said stop arm 13 and the opposing limiter arm 17.

During this period, the governor becomes operational due to a rise in the rotational frequency N, causing the lever 18 to move downwardly to reduce the rotational frequency. Downward movement of the lever 18 also causes descent of the pilot valve 20 under the force of spring 14 and spring seat 15, such descent being continued until the stop arm 13 and limiter arm 17 come in contact with each other. In other words, upward movement of the stop arm 13 limits the amount of descent of the pilot valve 20 (and hence the moving speed of the servo motor to be described later). With the descent of the pilot valve 20, constant pressure oil $Po_2$ is introduced into the chambers R$u$ and R$_L$ on both sides of the differential piston 29 to let it move downwardly. Since the amount of descent of the pilot valve 20 is limited within a very small range by the stop arm 13 as mentioned above, downward movement of the differential piston 29 is also very limited, and such downward movement is stopped as the lever 26 is turned through a pin 27 such that the projection 25 on the lever forces the sleeve 22 downward. The downward movement of the differential piston 29 is also accompanied by a corresponding downward movement of the plunger 30 which is directly coupled to the piston, causing constant pressure oil $Po_3$ to communicate with pressure oil Pc on the closed side of a servo motor (not shown) for opening and closing of guide vanes, thus permitting the servo motor to move in its closing direction. Since downward movement of the differential piston 21 is limited as indicated above, the plunger 30 is not downwardly moved to the extent necessary to permit full passage of $Po_3$ pressure oil to the Pc side, the movement being such that the piston portion 30' only opens the Pc pressure oil hole slightly so that movement of the servo motor is slow.

When the rotational frequency N begins to gradually decline as a result of the above-described operations, the electric current $i$ flowing through the transducer coil 2 changes causing downward movement of the movable coil 3, and the respective component members operate in an opposite manner to the above-described operations, causing descent of the stop arm 13. If, when the rotational frequency N begins to decline, it is still far higher than a prescribed lever, then the lever 18 is still moving downwardly under control of the governor. Thus, the spring 14 is maintained in a compressed state such that pilot valve 20 is moved downwardly with the descent of the stop arm 13 and the piston 30' of the plunger 30 gradually enlarges the opening to Pc, thereby gradually raising the closing speed of the servo motor.

In this manner, the guide vane closing speed is controlled continuously by estimating possible water pressure rise $\Delta$ P while taking into account such factors as rotational frequency N, acceleration $dN/dt$, degree of guide vane opening Y and head H, whereby it is possible to raise the guide vane closing speed as soon as the danger of water pressure rise $\Delta$ P has been removed, thus eliminating any waste of effective water and also shortening the time spent till the turbine stops. This allows quick return to normal operating condition of the governor and also provides extremely effective control of the rotational frequency.

In the situation where the load has been decreased once and is restored in a short time, then the rotational frequency N, which was increasing is immediately lowered to cause immediate decline of the electric current $i$ flowing through the transducer coil 2, such that movement of the guide vanes is immediately controlled by the governor to allow continuation of the normal and highly efficient operation.

When the degree of the reduction of the load is large, the electric current $i$ is correspondingly increased to allow greater upward movement of the stop arm 13, and if the arm is stopped at a position where it just contacts the limiter arm 17 of FIG. 4, then downward movement of the lever 18 is effected by instruction from the governor which compresses the spring 14. Thus, the other mechanisms in the pressure-distributing valve 23 are kept inoperative, which permits retention of the opening of the guide vanes as the present position. If decline of the load becomes larger, the stop arm 13 is further moved upwardly to let the limiter arm 17 move upwardly, causing pressure oil of $Po_2$ to flow only into the chamber R$_L$ while feeding pressure oil of $Po_3$ into pressure oil Po on the open side of the servo motor to let the guide vanes move once in the opening direction to increase the flow rate, thereby checking the rise of water pressure $\Delta P$. Thus, according to the water pressure rise controlling system of the present invention, the flow rate controlling device can be correctly and properly operated according to the degree of load fluctuation and is also promptly actuated by detecting such load fluctuation continuously, so that extremely effective control can be achieved.

It can thus be seen that according to the present invention, there is no loss of effective water and also the time required for stopping the hydraulic turbine is saved. Furthermore, the governor can restore the normal operation as soon as any danger of water pressure rise $\Delta P$ is removed, thus permitting constant highly effective operation. Moreover, control of the rotational frequency of the runner can be achieved at far higher efficiency than possible with the conventional techniques and arrangements.

Figure 6B:
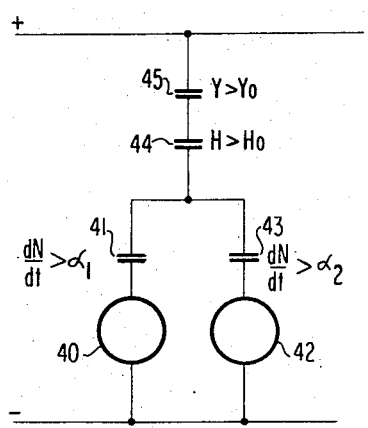
FIGS. 6a and 6b are a somewhat schematic view of another embodiment of the present invention and the electrical circuit therefor, respectively.
Figure 6A:
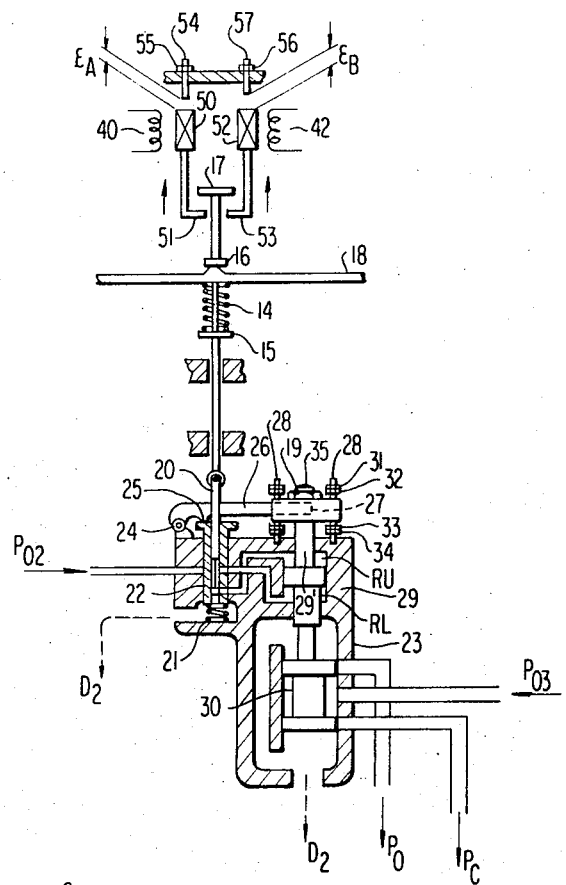

FIGS. 6a and 6b show a simplified modification of the mechanism shown in FIGS. 4 and 5 and an example of the water pressure rise estimating circuit. As indicated previously, the major factors causing the water pressure rise $\Delta P$ are rotational frequency N of the runner, acceleration $dN/dt$, head H and guide vane opening Y and among these factors, the most serious one is acceleration $dN/dt$. The embodiment of FIG. 6 includes an arrangement such that when the above-noted factors have exceeded certain predetermined values No, Ho and Yo, respectively, and the acceleration $dN/dt$ has exceeded a certain fixed value $\alpha 1$, $\alpha 2$, ($\alpha 1 < \alpha 2$), the closing speed $vY$ of the guide vanes is changed to $vYa$, $vYb$ ($vYa > vYb$).

According to this embodiment, as shown in FIG. 6b, the contacts 44 and 45 are closed when the head H exceeds Ho and the guide vane opening Y exceeds Yo, and the contacts 41 and 43 are closed when the acceleration $\alpha$ exceeds $\alpha 1$, and $\alpha 2$, respectively, to actuate the solenoids 40 and 42, respectively. In this arrangement, when the contacts 44 and 45 are closed and the acceleration $dN/dt$ exceeds $\alpha 1$, the contact 41 is closed to actuate solenoid 40. Upon actuation of the solenoid 40, the movable coil 50 is moved upwardly by a distance $\epsilon A$ and stops in abutment against the adjusting bolt 54. Upward movement of the movable coil 50 also causes upward movement of the stop arm 51 secured thereto to limit the amount of downward movement of the limiter arm 17. The succeeding operations are conducted in completely the same manner as in the embodiment of FIGS. 4 and 5 to slow down the moving speed in the closing direction of the servo motor for opening and closing of the guide vanes. If the acceleration $dN/dt$ is further increased from this condition to exceed $\alpha 2$, the contact 43 is closed to actuate the solenoid 42, causing the movable coil 52 to move upwardly by a distance $\epsilon B$. Since the distances $\epsilon A$ and $\epsilon B$ have relationship of $\epsilon A < \epsilon B$, the stop arm 53, which was moved upwardly with ascent of the movable coil 52, further limits the amount of downward movement of the limiter arm 17 to additionally slow down the closing speed of the servo motor. It is also possible to let the servo motor move in the opening direction through suitable adjustment of the adjusting bolt 56.

Figure 7:
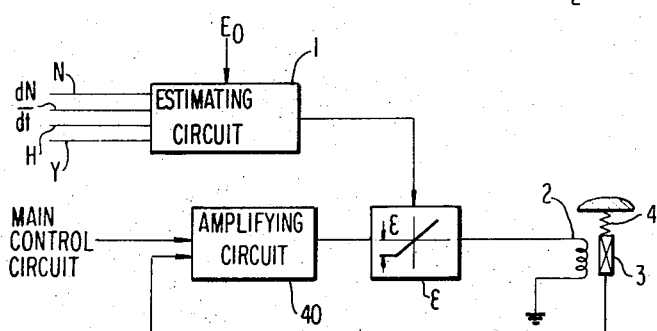
FIG. 7 is a somewhat schematic view of a further embodiment of the present invention.
Figure 7:
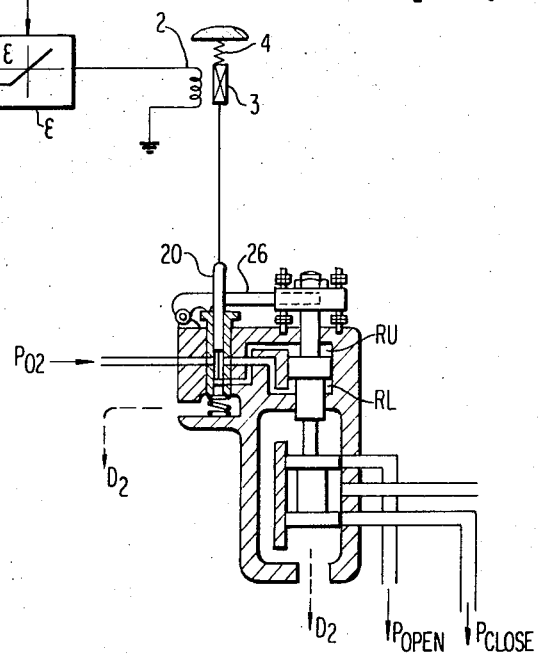

FIG. 7 shows still another embodiment of the present invention wherein the governor is controlled electrically. As shown, a movable coil 3 is directly connected to a pilot valve 20 so that a main control signal, or a signal instructing normal operation of the governor, is transmitted through an electrical amplifying circuit 40 and a limiter $\epsilon$ to a transducer coil 2 disposed opposite to said movable coil 3. The limiter $\epsilon$ is also arranged to receive a signal from the water pressure rise estimating circuit 1. In the event of a load fluctuation, the estimating circuit 1 provides a signal to the limiter $\epsilon$ which causes the main control signal to be intercepted and the signal from the estimating circuit 1 to be transmitted to the transducer coil 2. In this manner, the completely same operations and effects as in the aforedescribed mechanical controlling system can be obtained.

Although in the water pressure rise estimating circuit 1 described above, the rotational frequency N of the runner, acceleration $dN/dt$, head H and guide vane opening Y, which are varied upon interruption of the load, are given as the factors causing such water pressure rise $\Delta P$, it also is possible to add the flow rate in the penstock as an additional factor. In addition, estimation of $\Delta P$ can be made by utilizing each of these factors independently as a sole factor of such water pressure rise $\Delta P$.

Obviously, many modifications and variations of the present inven-tion are possible in the light of the above teachings. It should therefore be understood that within the scope of the appended claims, the invention may be practiced otherwise than as specifically described.

I claim:

1. A speed governor system for controlling the operation of a turbine fed water from a penstock in which the turbine is subjected to varying load conditions, the system comprising means for detecting the rotational frequency of the turbine runner, means for adjusting the output of the turbine in accordance with the detected rotational frequency of the runner, means for continuously estimating the degree of rise of water pressure in the penstock caused by an abrupt decline of the turbine load, and means for controlling said turbine output adjusting means in accordance with the estimated degree of the pressure rise.

2. A speed governor system according to claim 1, wherein said estimating means estimates the degree of water pressure rise in the penstock in accordance with the value and amount of variation of signals representative of turbine operational factors fed thereto, said factors including rotational frequency N of the runner, acceleration of the runner $dN/dt$ water head H, and guide vane opening of the turbine Y.

3. A speed governor system according to claim 1, wherein said turbine output adjusting means comprises a pressure-distributing valve responsive to the output of said runner rotational frequency detecting means, a servo motor controlled by said pressure-distributing valve, and a guide vane assembly controlled by said servo motor for adjusting the positioning of the guide vane assembly in accordance with a desired water flow rate into the runner, said pressure-distributing valve being controlled by said controlling means in accordance with the degree of water pressure rise estimated by said water pressure estimating means, the opening and closing of the guide vane assembly being controlled at a speed in accordance with the range of movement of the guide vane assembly.

4. A speed governor system according to claim 3, wherein said servo motor is actuated for controlling the immediate closing of the guide vane assembly in response to an abrupt decline of the turbine load.

5. A speed governor system according to claim 3, wherein said servo motor is responsive to an abrupt decline in the turbine load for first controlling the opening of the guide vane assembly and then for controlling the closing of the guide vane assembly.

6. A speed governor system according to claim 1, wherein said controlling means comprises a movable valve means including at least one coil means movable in response to the output of said estimating means, at least one movable stop arm responsive to said at least one movable coil means for displacement to a position in accordance with the output of said estimating means, and feedback means for feeding back to said movable valve means a signal corresponding to the amount of movement of said stop arm.

7. A speed governor system according to claim 6, wherein said turbine output adjusting means includes a pressure-distributing valve for controlling a servo motor, the range of control of the servo motor by said pressure distributing valve being limited in accordance with the position of said stop arm.

8. A speed governor system according to claim 2, including means for limiting the output of said estimating means, said limiting means including means responsive to at least one predetermined value of each of the turbine operational factors relating to water pressure rise for operating in a stepped manner in accordance with the value of the operational factors with respect to the predetermined value therefor.

9. A speed governor system according to claim 8, wherein said limiting means is provided with first and second predetermined values for the acceleration of the turbine runner and one predetermined value for each of the other turbine operational factors.

10. A speed governor system according to claim 1, wherein said turbine output adjusting means includes a pressure-distributing valve, said turbine output adjusting means being responsive to said rotational frequency detecting means for providing an electrical output signal, and limiting means responsive to the output of said water pressure rise estimating means and the output of said turbine output adjusting means for limiting the output signal of said turbine output adjusting means for controlling said pressure-distributing valve.

11. A speed governor system according to claim 6, wherein said movable valve means includes two movable coils, each coil having a stop arm associated therewith for limiting the control range of said pressure distributing valve.

* * * * *